US009807065B2

(12) United States Patent
Ranjan et al.

(10) Patent No.: US 9,807,065 B2
(45) Date of Patent: Oct. 31, 2017

(54) WIRELESS DEVICE AND COMPUTER READABLE MEDIUM FOR STORING A MESSAGE IN A WIRELESS DEVICE

(71) Applicant: Intel Deutschland GmbH, Neubiberg (DE)

(72) Inventors: Uma Ranjan, Bangalore (IN); Brajesh Kumar, Uttar Pradesh (IN); Dipu Vikram, Bangalore (IN)

(73) Assignee: INTEL DEUTSCHLAND GMBH, Neubiberg (DE)

( * ) Notice: Subject to any disclaimer, the term of this patent is extended or adjusted under 35 U.S.C. 154(b) by 0 days.

(21) Appl. No.: 15/182,706

(22) Filed: Jun. 15, 2016

(65) Prior Publication Data

US 2016/0352692 A1    Dec. 1, 2016

Related U.S. Application Data

(63) Continuation of application No. 11/843,724, filed on Aug. 23, 2007, now Pat. No. 9,391,997.

(51) Int. Cl.
| | | |
|---|---|---|
| H04W 12/04 | (2009.01) | |
| H04L 29/06 | (2006.01) | |
| G06F 21/62 | (2013.01) | |
| H04M 1/66 | (2006.01) | |
| H04M 1/725 | (2006.01) | |
| H04W 12/02 | (2009.01) | |
| H04W 12/08 | (2009.01) | |
| H04W 4/14 | (2009.01) | |
| H04W 12/06 | (2009.01) | |
| H04W 88/02 | (2009.01) | |

(52) U.S. Cl.
CPC ...... *H04L 63/0428* (2013.01); *G06F 21/6209* (2013.01); *H04L 63/06* (2013.01); *H04L 63/0861* (2013.01); *H04L 63/105* (2013.01); *H04M 1/66* (2013.01); *H04M 1/72552* (2013.01); *H04W 4/14* (2013.01); *H04W 12/02* (2013.01); *H04W 12/04* (2013.01); *H04W 12/06* (2013.01); *H04W 12/08* (2013.01); *H04M 2201/18* (2013.01); *H04W 88/02* (2013.01)

(58) Field of Classification Search
CPC ......... H04M 1/57; H04L 63/06; H04W 12/04; H04B 7/26
See application file for complete search history.

(56) References Cited

U.S. PATENT DOCUMENTS

2005/0154876 A1* 7/2005 Buckley ............... G06F 21/6209
                                                                    713/156
2005/0232422 A1* 10/2005 Lin .......................... H04K 1/00
                                                                    380/255

* cited by examiner

*Primary Examiner* — Myron K Wyche
(74) *Attorney, Agent, or Firm* — Viering, Jentschura & Partner mbB

(57) ABSTRACT

Embodiments of the disclosure include a wireless device and a computer readable medium with programmable instructions which when executed cause a processor of the wireless device to securely store a message. The device and computer readable medium are configured to receive a message at the device, filter the message according to at least one predetermined criteria, encrypt the message if the message includes at least the one predetermined criteria, and store the encrypted message in the wireless device.

20 Claims, 3 Drawing Sheets

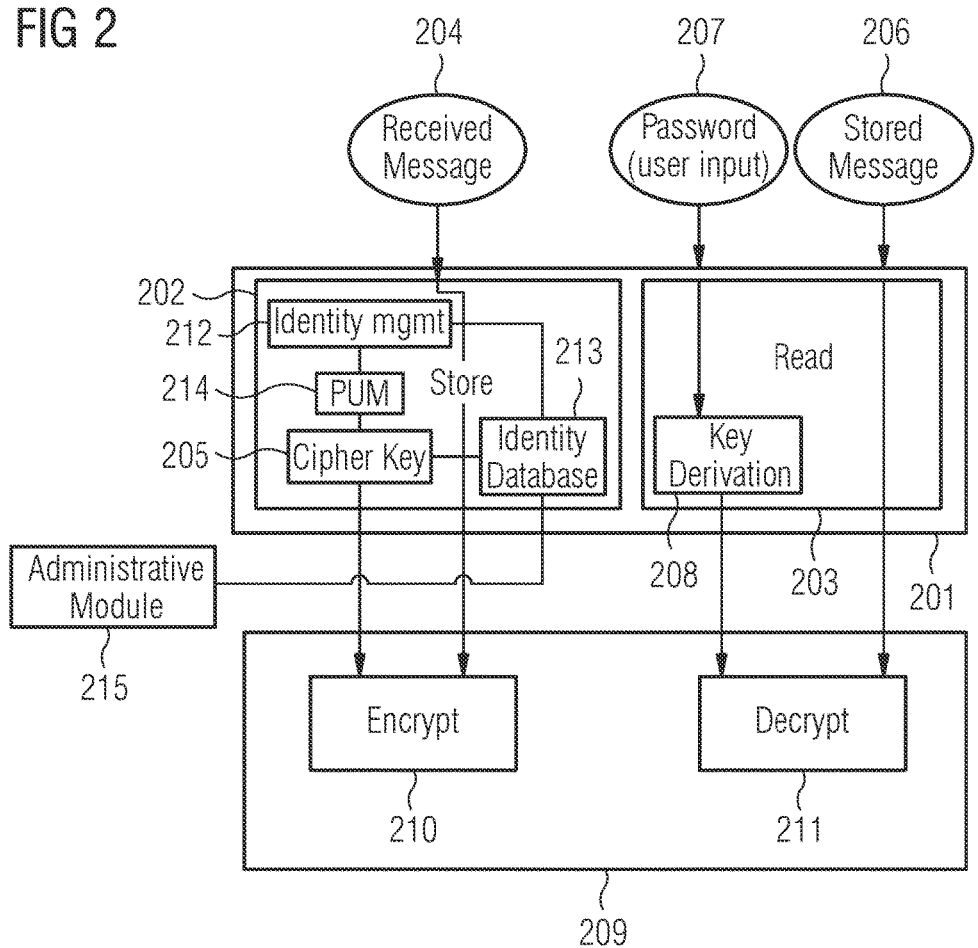

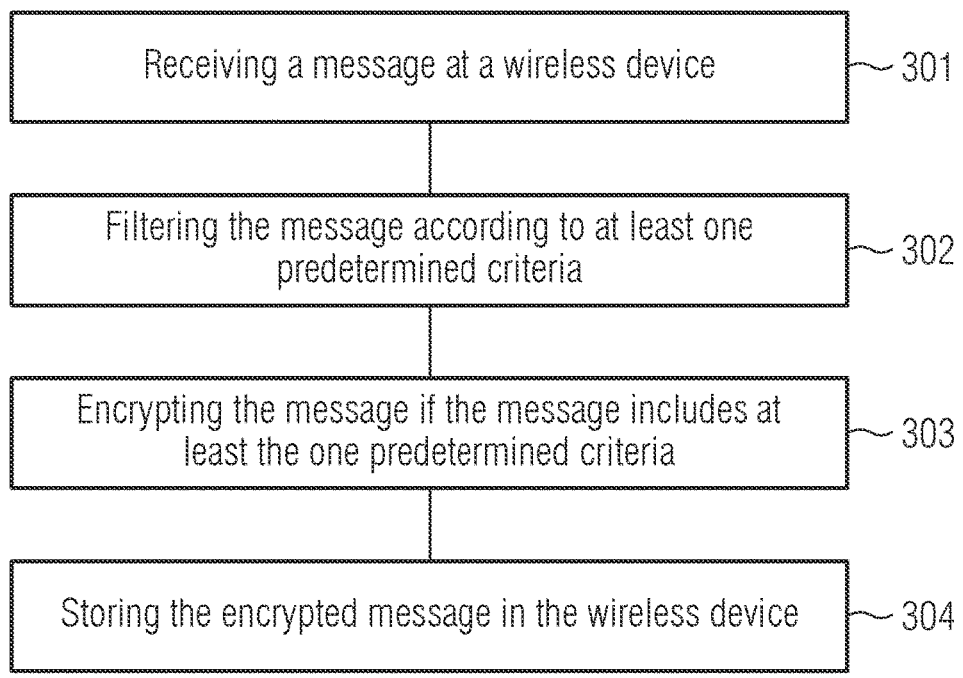

WIRELESS DEVICE AND COMPUTER READABLE MEDIUM FOR STORING A MESSAGE IN A WIRELESS DEVICE

CROSS-REFERENCE TO RELATED APPLICATIONS

This application is a continuation of application Ser. No. 11/843,724 filed on Aug. 23, 2007, which is hereby incorporated by reference in its entirety.

TECHNICAL FIELD

Embodiments of the invention relate generally to a message processing apparatus, to a wireless device and to a method of storing a message in a wireless device.

BRIEF DESCRIPTION OF THE SEVERAL VIEWS OF THE DRAWINGS

FIG. 2 shows a block diagram of a part of a wireless device in accordance with another embodiment of the invention;

FIG. 3 shows a method of storing a message in a wireless device in accordance with an embodiment of the invention.

DETAILED DESCRIPTION OF THE INVENTION

Figure 1:
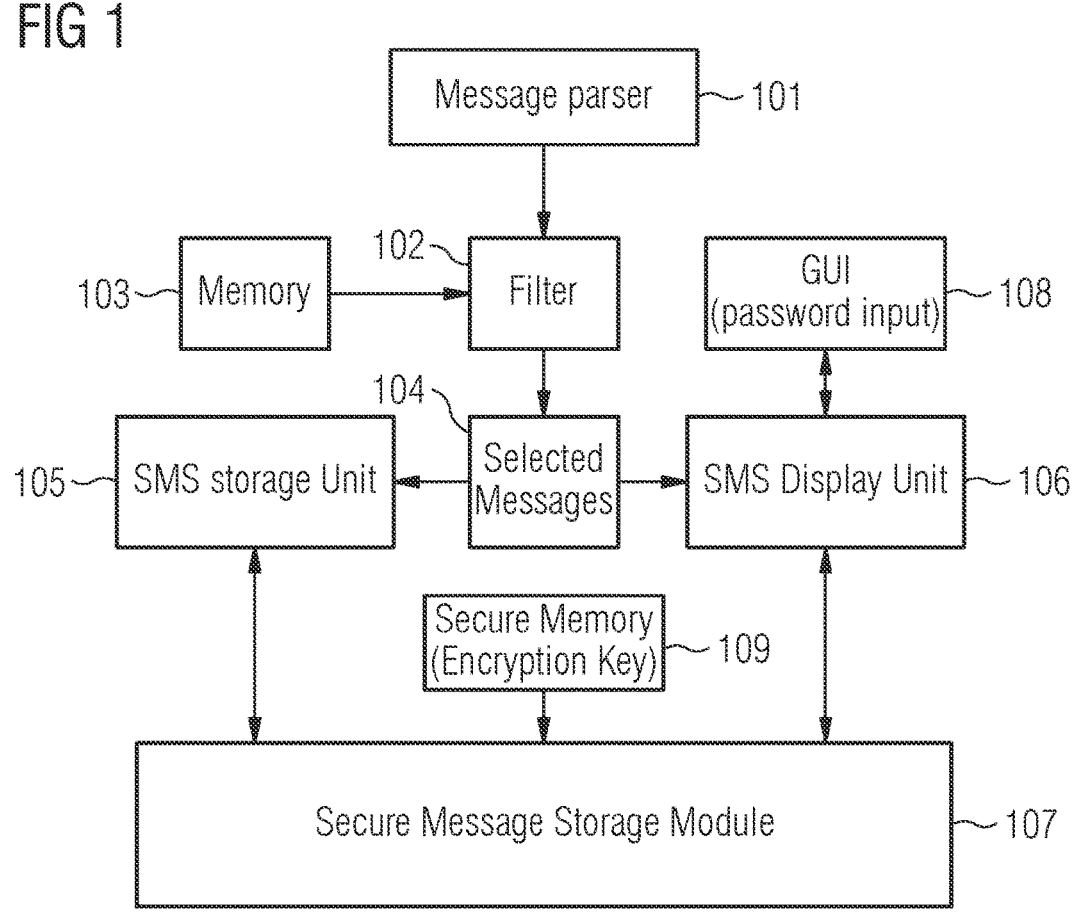
FIG. 1 shows a block diagram of a part of a wireless device in accordance with an embodiment of the invention.

The following detailed description explains exemplary embodiments of the present invention. The description is not to be taken in a limiting sense, but is made only for the purpose of illustrating the general principles of the invention. The scope of the invention, however, is only defined by the claims and is not intended to be limited by the exemplary embodiments described below.

When sensitive information is stored in a wireless device, for example a mobile phone, it is generally desirable to prevent unauthorized access to the sensitive information. It is also desirable to prevent unauthorized access in a user-friendly manner.

In an embodiment of the invention, methods implemented in a wireless device realize keeping sensitive information secure at all times by necessitating that messages or data containing sensitive information can be viewed only upon presenting some identification credentials without requiring involvement of the sender of the message or the data. This identification may include, but is not restricted to, a previously registered password or a fingerprint data. The identification must be presented each time the message or data is to be accessed. In an embodiment of the invention, the methods used do not involve any change in the infrastructure from the sender's end, hence they operate seamlessly with the normal messaging system.

Wireless devices, for example mobile phones or terminals, normally store messages they receive, for example messages according to the short message service (SMS) or messages according to the multimedia message service (MMS), as plain messages just as they were received. This enables anyone who has temporary access to the device to be able to read all the stored messages. Some messages may contain sensitive data, such as details of bank transactions. It is necessary to keep such information secure at all times, even from close friends and family. It is also important to keep such information secure from unauthorized people who may get access to the device through theft or loss of the device.

In many cases, SMS messages carry sensitive data which are preferably to be stored in a secured way. Examples of such data are messages from banks regarding salary credits, cheque transactions, transaction identifier for online transactions etc. If a mobile phone happens to be lost or otherwise accessible to people other than the owner, these messages have the potential to reveal a lot of information about the owner of the phone and subject him to targeted attacks. Hence, it is advantageous to store such information in a manner that only the owner can access it at any time.

Some mobile phones enable the locking of the phone by a personal identification number (PIN) or password when the phone is switched off or when there is no activity for a sustained period of time. However, this is an inconvenience to users and therefore this feature may be rarely used. Further, if the phone is stolen while the display is still active, all information is accessible to the unintended recipient. In this case, in order to prevent displaying a message carrying sensitive information, the message must be accessible only for the period of display of message, and must be protected at all other times.

Sensitive information may be protected by encrypting it before sending it over a wireless communication network, in other words, by sending it in an encrypted manner by the sender. However, this requires the sender also to be aware that his messages are considered confidential by the user. In this case the sender of the message also needs to have the secret key or a public key for each recipient. In other words, this necessitates the establishment of a shared common key between the sender and the recipient. For a user who needs to send messages to a plurality of recipients, for example a bank sending SMS to their customers, this involves the maintenance of as many keys as accounts, or otherwise to encrypt the message with more commonly available data such as card number or date of birth. These details are hardly a true secret and may be revealed by somebody having only a slight acquaintance with the owner.

In accordance with an embodiment of the invention, a method of storing a message in a wireless device is provided comprising receiving a message at a wireless device, filtering the message according to at least one predetermined criteria, encrypting the message if the message includes at least the one predetermined criteria and storing the encrypted message in the wireless device.

In accordance with another embodiment of the invention, a message processing apparatus is provided comprising a memory to store at least one predetermined criteria, a filtering unit to filter a message received by a wireless device according to the at least one predetermined criterion and an encryption unit to encrypt the message if the message includes at least the one predetermined criteria.

In accordance with yet another embodiment of the invention, a wireless device is provided comprising a message processing apparatus as described above in the preceding paragraph.

In an embodiment of the invention, a user of a wireless device, for example a mobile phone, is allowed to specify a list of telephone numbers from which he could receive sensitive information. The user may be allowed to store a list of numbers in a "special list". When an incoming message, for example a SMS or MMS, arrives, the number is checked against the special list. If it is a part of the list, the message is encrypted using an internally stored secret key. This secret key will be stored in a secure manner so that it can be accessed only by the application doing the actual encryption. When received messages are displayed, the encrypted messages will have a special indication on the display. In order to read such a message, the user has to enter an identification (such as a password or fingerprint swipe) which is used to derive the password. The message is then decrypted and displayed. The user has to present the identification every time the message is required to be read.

This has the effect that no changes are needed at the side of the sender of a message. The user can decide which sender or which senders he wants to encrypt messages from without involvement from the sender. This means that the encryption key can be changed by the recipient (the user of the wireless device) without an involvement of the sender. This has the further effect that no changes to a wireless communication network are needed. The only dependencies are between the application storing the messages in the wireless device and the application reading and displaying them.

In an embodiment of the invention, messages from certain numbers are stored in an encrypted format using a secret identification such as a password or a biometric identity such as fingerprint. The same identification must be entered by the user to be able to access the message.

In an embodiment of the invention, a user of a wireless device can decide which senders or which sender phone numbers or which message patterns he considers confidential and can choose to store such messages in an encrypted form. This does not need the intervention of the sender, although it is possible for a service provider (such as an operator) to specify additional senders to be considered confidential—either through a list in the subscriber identity module (SIM) or through a wireless application protocol (WAP) push action when a new service is registered for by the user.

In an embodiment of the invention, a message which has been stored in encrypted format is decrypted when the user presents credentials, such as a password or biometric data, from which the decryption key is derived.

In an embodiment of the invention, a message processing apparatus includes a decryption unit which processes supplied user credentials, such as a password or biometric data, to derive a decryption key or to decrypt a stored encrypted decryption key.

Embodiments of the invention can be implemented in hardware or in software or in combined hardware/software.

Referring to FIG. 1, a block diagram of a part of a wireless device in accordance with an embodiment of the invention is explained further. In order to simplify the description and the drawings, several typical elements and units of a usual wireless device which are well known to a person skilled in the art, for example a radio frequency transceiver, a baseband processor and a power supply, are not shown here.

The message parser 101, which is typically part of a GSM/GPRS or UMTS protocol stack, parses an incoming message, which may be a SMS, and passes it on to a filter (filtering unit) 102 to run through a set of rules. These rules include at least one predetermined criteria. They may include an exact match for the number or a set of keywords in the body of the message. The rules are stored in a memory 103 which is coupled to the filter. They may also be stored in a memory within the filter 102 (not shown here).

Based on the results of the filter 102, selected messages 104 are identified. In other words, messages which include at least the one predetermined criteria are identified as selected messages 104. The information about selected messages is available for access by both the SMS storage unit 105 (which stores a SMS in the wireless device) and the SMS display unit 106 (which displays a SMS to the user).

The SMS storage unit 105 receives the messages identified by the filter 102 as requiring secure storage and for such messages, it extracts the message text and passes it to the Secure Message Storage Module 107. The Secure Message Storage Module 107 encrypts the data (message text) received using an internal key which is accessed only by it and returns an encrypted message text to be stored. The internal key (encryption key) is read out from a secure memory 109. The SMS storage unit 105 replaces the original message text with the encrypted text received from the Secure Message Storage Module 107, sets indication bits to indicate that the SMS is now encrypted and stores it in the wireless device.

The SMS display unit 106 checks the indication bits corresponding to the stored SMS before displaying the message. For messages which are identified as encrypted, it does not try to display the message, but first gets it decrypted by the Secure Message Storage Module 107. In order to do this, it also obtains a password from the user via a graphical user interface (GUI) 108 (and an input device, not explicitly shown here). The SMS display unit 106 sends the password and the data (message body) to the Secure Message Storage Module 107, which derives the decryption key from the password to decrypt the message body. This decryption key so obtained is capable of decrypting a message encrypted with the encryption key which was previously used for storing the message.

Referring to FIG. 2, a block diagram of a part of a wireless device in accordance with another embodiment of the invention is explained further. In order to simplify the description and the drawings, several typical elements and units of a usual wireless device which are well known to a person skilled in the art, for example a radio frequency transceiver, a baseband processor and a power supply, are not shown here.

The block diagram shown in FIG. 2 corresponds to a more detailed view of an embodiment of the Secure Message Storage Module 107 of FIG. 1. This embodiment includes a store/read section 201 which has a store module 202 and a read module 203 corresponding to the store and read functions, respectively. The store module 202 takes data as input. It is provided with the received message 204. An internal cipher key 205 is used to encrypt the received message 204. The read module 203 takes as input both a data and a password. It is provided with the stored message 206 and the password 207. The password 207 is input by the user of the wireless device. An internal key to decrypt the stored message 206 is derived from the password 207 through a key derivation mechanism 208. If the password was correct the stored message 207 can be successfully decrypted using the derived key.

The cryptographic functions are provided by a cryptographic module (or cipher module) 209. The cryptographic module may be a symmetric or an asymmetric cipher module. It includes an encryption unit 210 which is coupled to the store module 202. It also includes a decryption unit 211 which is coupled to the read module 203.

To preserve the integrity of the Secure Message Storage Module 107, the internal cipher key 205 is security protected, for example by a hardware access control element, so that the key is accessible only by the store module 202. This enhances the protection of sensitive messages from unauthorized access especially in cases where the integrity of the read module 203 cannot be guaranteed.

The identity management module 212 performs the function of registering a secret information representing an identity of an authorized user of the wireless device in the beginning. The identity information is stored in the identity database 213. The identity management module 212 also performs the function of updating the identity when required, for example changing of password or, in case of biometric authentication, changing of user. Updating the identity involves the following actions: verifying the current (old) identity, decrypting the messages with the current (old) identity, re-encrypting the messages with the new identity, storing the new identity information in the identity database.

When a password is changed, the cipher key 205 in the store module 202, which is derived from the password, is also changed. A password update module (PUM) 214 performs this function. The password change is authorized by checking the old password against the stored key.

The administrative module 215 can only be activated by a trusted authority, for example an authorized service center. In a case when the user has forgotten his password, the administrative module 215 permits the registering of a new password without the requirement of the current password. Similar to an update of the identity by the identity management module, the stored password on the wireless device is used to decrypt the stored messages and the messages are re-encrypted with a new password. The software which accesses the stored password for decoding it is a security sensitive piece of code and therefore it is ensured that this code can be executed on a processor of the wireless device only upon a special administrative authorization by a trusted authority. The administrative module performs the following operations: decrypting the messages with the old identity, re-encrypting the messages with the new identity, storing the new identity information in the identity database.

In an embodiment of the invention, instead of implementing a password-based scheme, a biometric scheme is used.

In an embodiment of the invention, some bits of the SMS message may be modified to indicate that the message is a secure message, for example some of the reserved bits (bits 3 and 4 of "PDU" type in a mobile-terminated SMS ("DELIVER-SMS")). This value will indicate that the message, more precisely the body of the message, is encrypted and needs to be handled differently. The used encryption algorithm may be a chosen standard, such as AES128, or may again be specified through another reserved bit. If the encryption algorithm results in an alteration of the length of the message text in such a manner that the maximum allowed length of the SMS text message is exceeded, a different algorithm may be used for encryption. Alternatively, the secure SMS may be sent as an MMS as an application data, which is of a new content type and format. It may also be made operator-specific if the operator defines a proprietary MMS type.

FIG. 3 shows a method of storing a message in a wireless device in accordance with an embodiment of the invention.

In 301, a message is received at a wireless device. The message may be received through a communication connection associated with a public wireless communication network. The message may be received in an unencrypted format. The received message may be a text message, a Short Message Service (SMS) message or a Multimedia Message Service (MMS) message.

In 302, the message is filtered according to at least one predetermined criteria. The filtering of the message according to at least one predetermined criteria may include comparing an assigned sender information associated with the message to a predetermined sender information. The assigned sender information may be a phone number. The predetermined sender information may be a list of predetermined phone numbers. The filtering of the message according to at least one predetermined criteria may include comparing a content of the message with a predetermined content. The predetermined content may includes at least one keyword.

In 303, the message is encrypted if the message includes at least the one predetermined criteria. Encrypting the message may include encrypting the message using a secret key. The secret key may be retrieved from a secure memory associated with the wireless device.

In 304, the encrypted message is stored in the wireless device. The encrypted message may be retrieved from the wireless device and decrypted, if a correct secret information assigned to the secret key was received. The secret information to be received may be derived from biometric information. The encrypted message may be retrieved from the wireless device and decrypted, if correct user credentials are supplied by a user attempting to read the message. The decryption key may be derived from user credentials, which may be a biometric information.

What is claimed is:

1. A non-transitory computer readable medium with programmable instructions which when executed cause a processor of a wireless device to securely store a message, comprising:
   determining whether an un-encrypted message received at the wireless device includes at least one predetermined criteria, the wireless device being a recipient identified in the un-encrypted message, wherein the determining whether the un-encrypted message includes the at least one predetermined criteria includes comparing an assigned sender information associated with the un-encrypted message to a predetermined sender information and identifying a source of the un-encrypted message;
   responsive to said comparing the assigned sender information associated with the message and identifying the source of the un-encrypted message to the predetermined sender information, encrypting the message in the wireless device; and
   storing the encrypted message in the wireless device.

2. The non-transitory computer readable medium of claim 1, wherein receiving the message at the wireless device includes receiving the message through a communication connection associated with a public wireless communication network.

3. The non-transitory computer readable medium of claim 1, wherein the received message is a text message, a Short Message Service (SMS) message or a Multimedia Message Service (MMS) message.

4. The non-transitory computer readable medium of claim 1, wherein the assigned sender information is a phone number.

5. The non-transitory computer readable medium of claim 1, wherein the predetermined sender information is a list of predetermined phone numbers.

6. The non-transitory computer readable medium of claim 1, wherein the determining whether the message includes the at least one predetermined criteria includes comparing a content of the message with a predetermined content.

7. The non-transitory computer readable medium of claim 1, wherein the predetermined content includes at least one keyword.

8. The non-transitory computer readable medium of claim 1, further comprising modifying an indication bit associated with the message.

9. The non-transitory computer readable medium of claim 1, wherein encrypting the message includes encrypting the message using a secret key.

10. The non-transitory computer readable medium of claim 9, further comprising retrieving the secret key from a secure memory associated with the wireless device.

11. The non-transitory computer readable medium of claim 9, further comprising retrieving the encrypted message from the wireless device, receiving a secret information assigned to the secret key, and decrypting the retrieved message.

12. The non-transitory computer readable medium of claim 11, wherein the secret information is derived from biometric information.

13. A wireless device comprising:
a receiver configured to receive an un-encrypted message through a communication connection associated with a public wireless communication network;
a message processing apparatus, comprising:
a memory configured to store at least one predetermined criteria;
a filtering unit configured to determine whether the un-encrypted message includes the at least one predetermined criteria, the wireless device being the recipient identified in the un-encrypted message, wherein the determining whether the un-encrypted message includes the at least one predetermined criteria includes comparing an assigned sender information associated with the un-encrypted message and identifying a source of the un-encrypted message to a predetermined sender information;
a storage unit; and an encryption unit;
wherein the storage unit is configured to, responsive to said comparing the assigned sender information associated with the un-encrypted message and identifying the source of the un-encrypted message to the predetermined sender information, pass the un-encrypted message to the encryption unit for encryption of the message and, responsive to said comparing the assigned sender information associated with the un-encrypted message and identifying the source of the un-encrypted message to the predetermined sender information, to store the encrypted message in the wireless device.

14. The device of claim 13, the filtering unit further configured to compare a content of the message with a predetermined content and the memory further to store the predetermined content.

15. The device of claim 13, the encryption unit further configured to encrypt the message using a secret key.

16. The device of claim 15, further comprising a key retrieving unit to retrieve the secret key from a secure memory associated with the wireless device.

17. The device of claim 15, further comprising an input unit to receive a secret information assigned to the secret key.

18. The device of claim 15, further comprising a decryption unit configured to decrypt the encrypted message only if a correct secret information assigned to the secret key has been received.

19. The device of claim 13, further comprising an identity management unit configured to register a secret information representing an identity of an authorized user of the wireless device.

20. The device of claim 19, the identity management unit further configured to assign the secret information to a secret key.

* * * * *